(12) United States Patent
Valdevit

(10) Patent No.: US 7,103,711 B2
(45) Date of Patent: Sep. 5, 2006

(54) DATA LOGGING BY STORAGE AREA NETWORK DEVICES TO A RESERVED STORAGE AREA ON THE NETWORK

(75) Inventor: Ezio Valdevit, Redwood City, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 261 days.

(21) Appl. No.: 10/347,645

(22) Filed: Jan. 21, 2003

(65) Prior Publication Data

US 2004/0143702 A1   Jul. 22, 2004

(51) Int. Cl.
*G06F 13/00* (2006.01)
*G06F 12/00* (2006.01)

(52) U.S. Cl. .................. 711/111; 711/100; 711/114; 711/154

(58) Field of Classification Search ............ 711/114, 711/154, 100, 111
See application file for complete search history.

(56) References Cited

U.S. PATENT DOCUMENTS

| 5,546,535 A | * | 8/1996 | Stallmo et al. ............. 714/9 |
| 6,400,730 B1 | * | 6/2002 | Latif et al. ............. 370/466 |
| 6,542,961 B1 | * | 4/2003 | Matsunami et al. ....... 711/114 |
| 6,748,469 B1 | * | 6/2004 | Caldwell et al. .......... 710/71 |

* cited by examiner

*Primary Examiner*—Tuan V. Thai
(74) *Attorney, Agent, or Firm*—Wong, Cabello, Lutsch, Rutherford & Brucculeri, LLP

(57) ABSTRACT

Storage area network (SAN) switches having greater storage capacity to allow greater data logging and storage of larger, more complicated tables for zoning and other table-based applications. A hard disk drive can be included in the switch, with data logging performed to the hard disk drive and with the hard disk drive serving as a second level of virtualization to provide storage of large tables. In a variation, the data logging of the switch, and any other devices on the SAN, can be directed to an area or areas of one or more storage units attached to the SAN.

9 Claims, 4 Drawing Sheets

DATA LOGGING BY STORAGE AREA NETWORK DEVICES TO A RESERVED STORAGE AREA ON THE NETWORK

BACKGROUND OF THE INVENTION

1. Field of Invention

The present invention relates generally to storage area networks (SANs), and more particularly to having SAN devices log data to a reserved area on a storage unit in the SAN.

2. Description of the Related Art

As computing power and storage requirements increased, a problem developed relating to properly and cost effectively matching storage and computing resources. Directly connecting the storage units of the computing hosts often resulted in excess storage capacity to ensure that at least enough was present. This was not cost effective. To address this problem storage area networks (SANs) were developed. In a SAN a series of hosts are connected to a series of storage units using a switching network, the switching network being called a fabric. By this architecture storage capacity could be dynamically added and allocated to the hosts.

The fabric is developed using a series of interconnected switches. Properly connecting the switches allows high performance connections between the hosts and the storage unit.

One further requirement of modern computer systems is high reliability, particularly for the hosts, storage units and switches in a SAN, as loss of services of the units could result in large downtime costs or delay in providing the related services. Thus, it is desirable that error logs be kept of each device to aid troubleshooting efforts. But this is complicated in the switches of a SAN because the switches have only very limited long term storage capabilities.

While it was stated above that properly connecting the switches allows high performance, as the SAN grows determining the proper connections becomes extremely difficult. Modern switches include performance monitoring capabilities, but again limited storage capacity has limited the use that can be made of any performance monitoring data.

The configuration of the SAN is further complicated by security features. In many cases it is desirable that certain hosts not be able to have access to certain storage units, or even just areas of storage units. This is accomplished with various zoning techniques, such as those shown in U.S. patent applications Ser. No. 09/426,567 "Method And System For Creating And Implementing Zones Within A Fibre Channel System," by David Banks, Kumar Malavalli, Paul Ramsay, Kha Sin Teow, and Jieming Zhu, filed Oct. 22, 1999 and Ser. No. 10/123,996 "Fibre Channel Zoning By Device Name In Hardware" by Ding-Long Wu, David C. Banks and Jieming Zhu, filed Apr. 17, 2002, which are hereby incorporated by reference. Zoning works by establishing tables of devices allowed to communicate. But these tables can get very large in complicated and/or large networks and the storage capacity of the switches is small. While the second application discloses using a virtual system with a larger table maintained in memory to supplement smaller tables maintained in the hardware, the tables still have a limited size.

It would be desirable to increase the data storage capacity of switches to allow larger tables and to allow much more storage of error or diagnostic data and performance monitoring data for all devices in the SAN to allow better diagnosis and management of the SAN.

SUMMARY OF THE INVENTION

The present invention provides SAN switches having greater storage capacity to allow greater data logging and storage of larger, more complicated tables for zoning and other table-based applications. More specifically, a hard disk drive can be included in the switch, with data logging performed to the hard disk drive and with the hard disk drive serving as a second level of virtualization to provide storage of large tables.

In a variation, the data logging of the switch, and any other devices on the SAN, can be directed to an area or areas of one or more storage units attached to the SAN. By reserving portions of the low cost storage available in the storage units, the need for very large and relatively expensive storage units in the various devices, such as switches, hosts and other storage units, so that the total cost of logging large volumes of data is reduced. Further, by having all devices log to the same general area greatly simplifies management by not requiring the management utility to access each individual device in the SAN.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Figure 1:
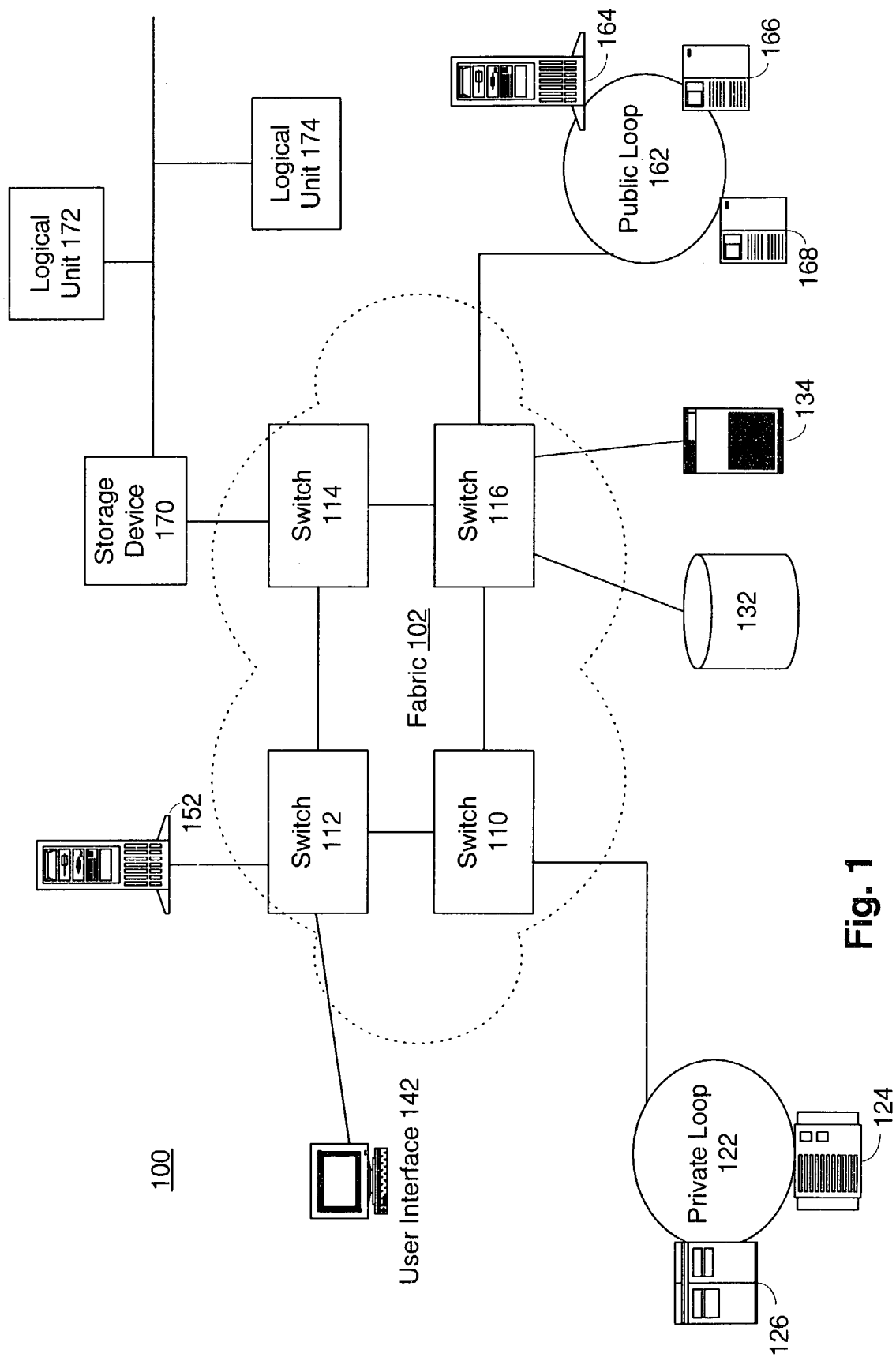
FIG. 1 illustrates a system diagram of a Fibre Channel network with a zone specified in an embodiment of the present invention.

FIG. 1 illustrates a Fibre Channel network 100. Generally, the network 100 is connected using Fibre Channel connections (e.g., optical fiber and coaxial cable). In the embodiment shown and for illustrative purposes, the network 100 includes a fabric 102 comprised of four different switches 110, 112, 114, and 116. It will be understood by one of skill in the art that a Fibre Channel fabric may be comprised of one or more switches.

A variety of devices can be connected to the fabric 102. A Fibre Channel fabric supports both point-to-point and loop device connections. A point-to-point connection is a direct connection between a device and the fabric. A loop connection is a single fabric connection that supports one or more devices in an "arbitrated loop" configuration, wherein signals travel around the loop through each of the loop devices. Hubs, bridges, and other configurations may be added to enhance the connections within an arbitrated loop.

On the fabric side, devices are coupled to the fabric via fabric ports. A fabric port (F_Port) supports a point-to-point fabric attachment. A fabric loop port (FL_Port) supports a fabric loop attachment. Both F_Ports and FL_Ports may be referred to generically as Fx_Ports. Typically, ports connecting one switch to another switch are referred to as expansion ports (E_Ports).

On the device side, each device coupled to a fabric constitutes a node. Each device includes a node port by which it is coupled to the fabric. A port on a device coupled in a point-to-point topology is a node port (N_Port). A port on a device coupled in a loop topology is a node loop port (NL_Port). Both N_Ports and NL_Ports may be referred to generically as Nx_Ports. The label N_Port or NL_Port may be used to identify a device, such as a computer or a peripheral, which is coupled to the fabric.

Loop devices (NL_Ports) coupled to a fabric may be either "public" or "private" devices that comply with the respective Fibre Channel standard (e.g., Fabric Loop Attach standard FC-FLA, or Fibre Channel Private Loop Direct Attach FC-PLDA, respectively). Those skilled in the art will be familiar with the configurations for enabling public and private devices to operate in compliance with ANSI specifications (e.g., X3.272 1996; T11 project 1133-D) and the NCITS specification (e.g., NCITS TR-20 1998; NCITS TR-19 1998).

Typically, private loop devices cannot log into an attached fabric and are thus incapable of communicating with other fabric devices. However, a well-suited method for allowing private loop devices to communicate with public fabric-attached devices is disclosed in commonly assigned U.S. Pat. No. 6,401,128, entitled "System and Method for Sending and Receiving Frames Between a Public Device and a Private Device," by Stai, et al., the subject matter of which is hereby incorporated by reference in its entirety. In general, private addresses reside at the "end points" of the fabric, and upon entering a loop, frames having the format of the private address are transformed to a format associated with a public address. This implies that there is a representation of private traffic in a public format when a frame navigates through a loop. Thus, the discussion of frame filtering to follow applies to both public and private devices attached to a fabric, as well as to frames having a representation in a public format of a private address.

In the embodiment shown in FIG. 1, fabric 102 includes switches 110, 112, 114 and 116 that are interconnected. Switch 110 is attached to private loop 122, which is comprised of devices 126 and 124. Switch 112 is attached to device 152. Switch 114 is attached to device 170, which has two logical units 172, 174 attached to device 170. Typically, device 170 is a storage device such as a RAID device, which in turn may be logically separated into logical units illustrated as logical units 172 and 174. Alternatively the storage device 170 could be a JBOD or just a bunch of disks device, with each individual disk being a logical unit. Switch 116 is attached to devices 132 and 134, and is also attached to public loop 162, which is formed from devices 164, 166 and 168 being communicatively coupled together. A user interface 142 also connects to the fabric 102.

Figure 2:
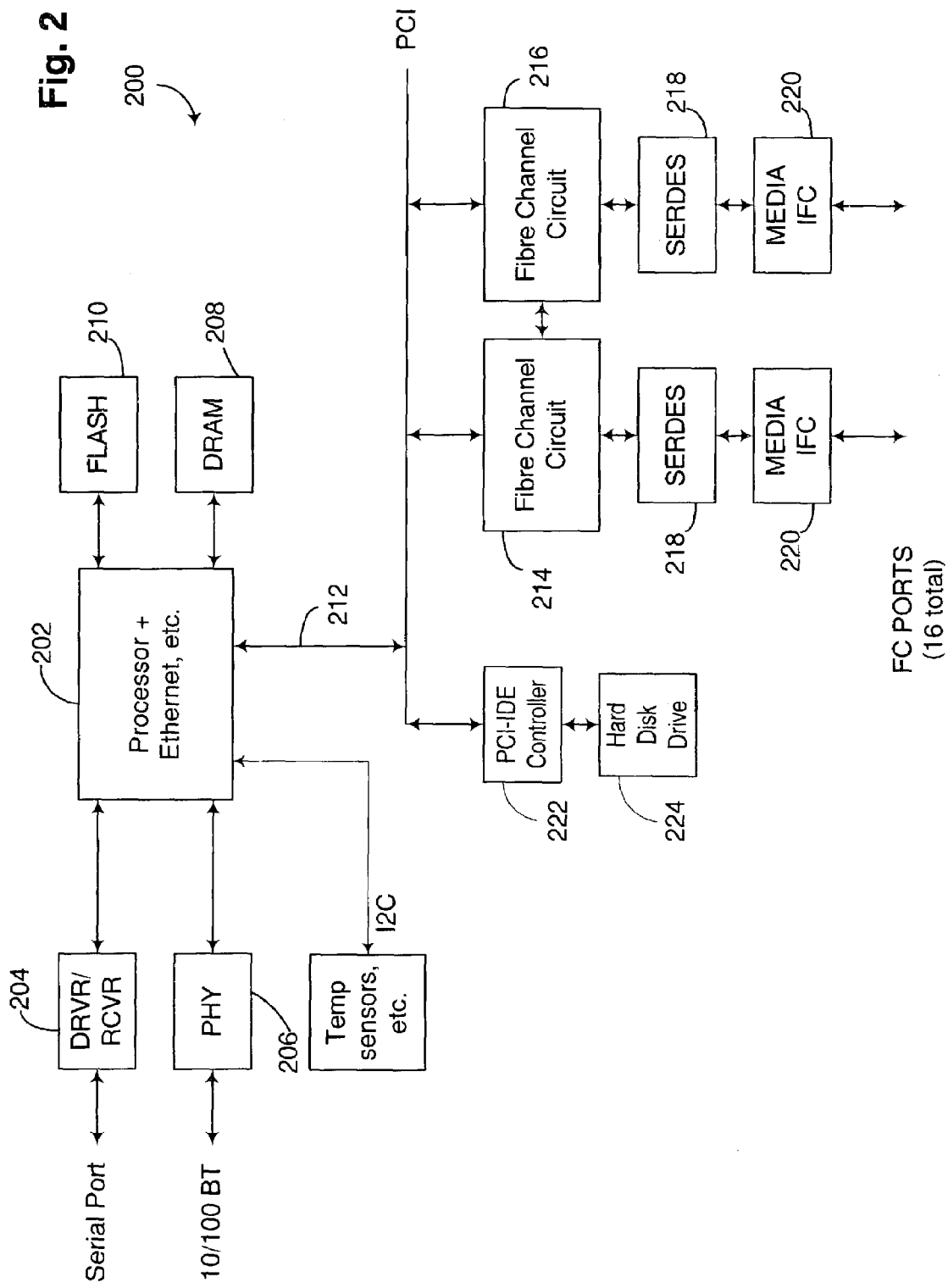
FIG. 2 is a block diagram of a switch according to an embodiment of the present invention.

FIG. 2 illustrates a basic block diagram of a switch 200, such as switches 110, 112, 114, or 116 according to the preferred embodiment of the present invention. A processor and I/O interface complex 202 provides the processing capabilities of the switch 200. The processor may be any of various suitable processors, including the Intel i960 and the IBM PowerPC. The I/O interfaces may include low speed serial interfaces, such as RS-232, which use a driver/receiver circuit 204, or high-speed serial network interfaces, such as Ethernet, which use a PHY circuit 206 to connect to a local area network (LAN). Main memory or DRAM 208 and flash or permanent memory 210, are connected to the processor complex 202 to provide memory to control and be used by the processor.

The processor complex 202 also includes an I/O bus interface 212, such as a PCI bus, to connect to Fibre Channel circuits 214 and 216. The Fibre Channel circuits 214, 216 in the preferred embodiment each contain eight Fibre Channel ports. Each port is connected to an external SERDES circuit 218, which in turn is connected to a media interface 220, which receives the particular Fibre Channel medium used to interconnect switches used to form a fabric or to connect to various devices. A PCI-IDE controller 222 is connected to the PCI bus 212 and to a hard disk drive 224.

As described in the referenced zoning applications, tables are used to define zone members. As such, the table requires a given amount of space. As the network gets more complicated, with more hosts, storage units and switches, the tables grow rapidly, potentially exponentially. In the zoning embodiments these tables are maintained in the memory 208 of the switch. But there are many competing items also requiring use of the memory 208. Thus the table space used for zoning must be limited. Therefore, there is a limit on the zoning complexity that can be handled by the switch. In embodiments according to the present invention, the full zoning tables are maintained on the hard disk drive 224, with the memory 208 acting as a cache for portions of the table. Thus, table size can be virtually unlimited because of the great storage space increase a hard disk drive provides. Caching portions of the table into the memory 208, or further into the hardware in some cases, allows a minimal drop in overall switch performance.

The same storage of tables on the hard disk drive 224 and caching into memory 208 applies for the other tables maintained in the switch 200, such as the SNS tables.

The switch 200 also contains various performance monitoring capabilities. These vary with each switch, but include traffic through a given port, etc. Additionally, many switches also include capabilities to monitor traffic between specific end points and other advanced items. Certain switches, such as those described in Ser. No. 10/123,996, include the ability to define a series of very flexible counters. Thus, switches can provide a great deal of data about packets they process. But storing this data is very problematic due to the very limited storage capacity of the switches. As a result, it is very difficult to do significant tuning or optimization of the SAN because sufficient data is not available and proper tuning generally requires a large amount of data for statistical reasons. In embodiments according to the present invention this data is stored to the hard disk drive 224. The size of the hard disk drive 224 allows a large amount of data to be stored, thus allowing any performance tuning applications to have sufficient data to perform statistically valid operations. The presence of the hard disk drive 224 in the switch 200 and storing the data there is advantageous over transmitting the data to the tuning application as the limited memory 208 space is filled because developing the packets to transmit the data is a time consuming process and may interfere with operations of the switch 200. By allowing much quicker storage to the hard disk drive 224, normal performance is not hindered. The data can be retrieved during slack times when the switch 200 is not particularly busy and can do the necessary packet building and transmitting operations without interfering with normal switch functions.

Diagnostics and error analysis are necessary in troubleshooting of both switch and fabric problems. But current switches have extremely limited capacity to store errors and diagnostic results. In embodiments according to the present invention, diagnostic and error data is stored on the hard disk drive 224. This allows the development of a large diagnostic/error log to be used in troubleshooting efforts.

Figure 3:
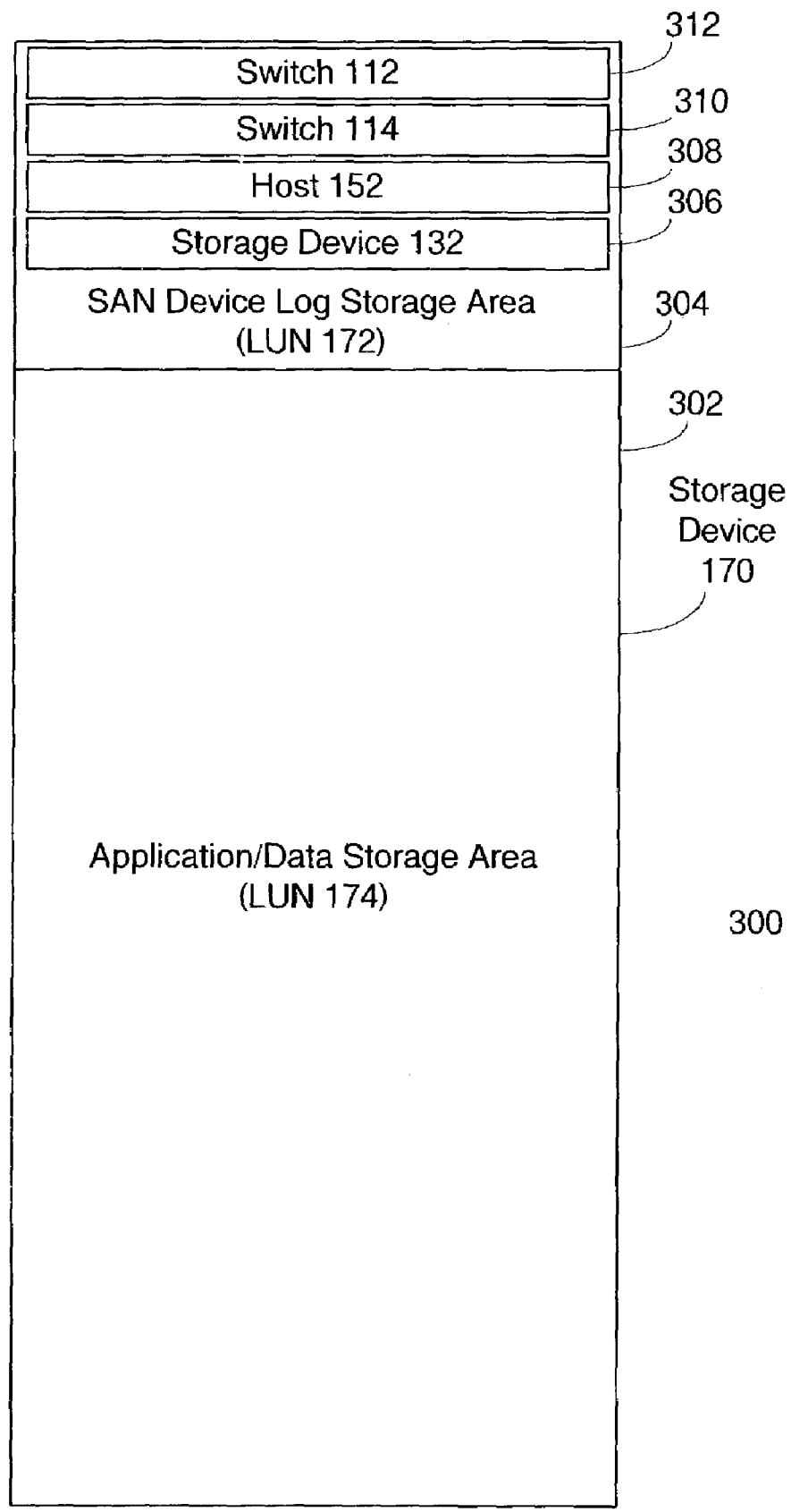
FIG. 3 is a logical map showing the partitioning of a storage unit according to an embodiment of the present invention.

For an alternate embodiment, please refer to FIG. 3, where a partitioning 300 of storage device 170 is shown. A first partition 304 is logical unit 172 and a second partition 302 is logical unit 174. In the illustrated embodiment logical unit 172 is reserved to receive data logging information from the various devices on the SAN 100. More specifically, areas 306, 308, 310, and 312 are shown as being used by storage device 132, host 152, switch 114 and switch 112, respectively.

In this embodiment according to the present invention each device can perform data logging to the partition 304. If desired, none of the devices used have any internal storage, particularly hard disk storage, for data logging. As data needs to be logged, it is provided from the device to its respective area in partition 304. Thus, all devices can make use of the much lower cost (per unit) storage associated with the storage device 170 rather than any more expensive internal storage. One advantage of this embodiment is that all devices on the SAN can perform data logging. A second advantage is that the storage cost for the logged data is lower.

A third advantage is that it is easier for a management or analysis application to access all the data for the entire SAN. The application need only access the storage unit, which is optimized to provide data at high speeds. Otherwise the application would have to access each device in the SAN, each potentially with a different protocol, and retrieve data from a device not efficient at sending large amounts of data from its own internal long term storage. Therefore, the application is greatly simplified and also can operate at a much greater speed.

Figure 4:
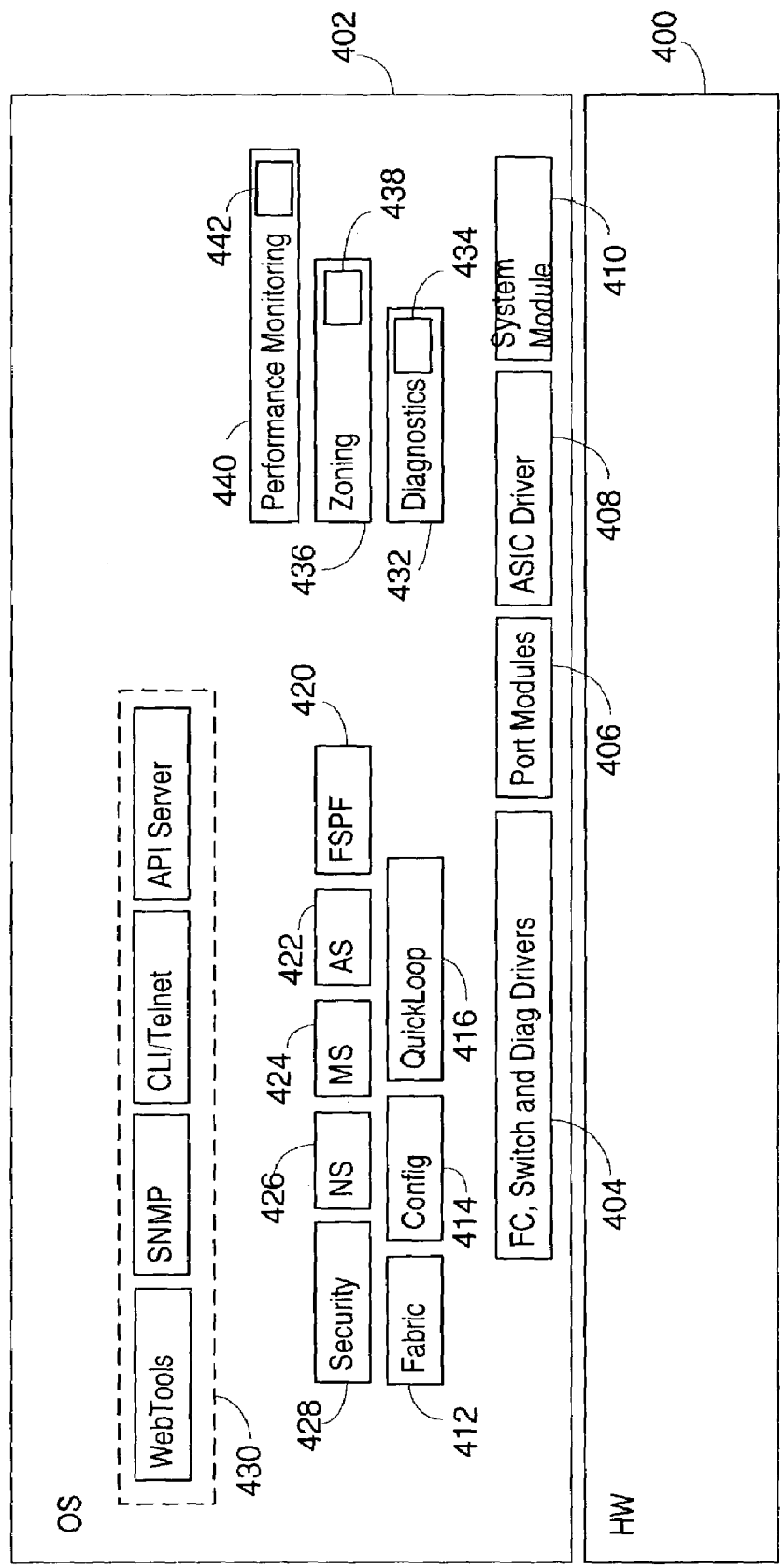
FIG. 4 is an illustration of the software modules in a switch according to an embodiment of the present invention.

Proceeding then to FIG. 4, a general block diagram of the switch 200 hardware and software is shown. Block 400 indicates the hardware as previously described. Block 402 is the basic software architecture of the virtualizing switch. Generally think of this as the switch operating system and all of the particular modules or drivers that are operating within that embodiment. Modules operating on the operating system 402 are Fibre Channel, switch and diagnostic drivers 404; port modules 406, if appropriate; a driver 408 to work with the Fibre Channel ASIC; and a system module 410. Other switch modules include a fabric module 412, a configuration module 414, a quick loop module 416 to handle private-public address translations, an FSPF or Fibre Shortest Path First routing module 420, an AS or alias server module 422, an MS or management server module, a name server module 426 and a security module 428. Additionally, the normal switch management interface 430 is shown including web server, SNMP, telnet and API modules.

Three exemplary modules are modified according to the present invention. The diagnostics module 432, the zoning module 436 and the performance monitoring module 440 all include new portions 434, 438, and 442 to handle storing relevant data on the hard disk drive 224 or in the relevant area in the first portion 304, as appropriate for the particular embodiment. Other modules can contain similar new portions if desired.

The above examples are simplified for explanation purposes. In many cases it would be desirable to duplicate any stored data for redundancy reasons. For example, the switch 200 could include dual hard devices and the various devices could send the data logged to logical unit 172 to a second logical unit elsewhere in the SAN.

The foregoing disclosure and description of the invention are illustrative and explanatory, and various changes in the size, shape, materials, components, circuit elements, wiring connections and contacts, as well as in the details of the illustrated circuitry and construction and method of operation may be made without departing from the spirit of the invention.

What is claimed is:

1. A storage area network comprising:
   a first storage device having a reserved area for receiving logging data, having a storage device address and for receiving serial data packets;
   a second storage device for storing data, having a storage device address and for receiving serial data packets;
   a host for providing serial data packets addressed to said first storage device or said second storage device;
   a packet switching device for switching serial data packets between serial communication links based on addresses in the serial data packets;
   a first serial communication link between said first storage device and said packet switching device;
   a second serial communication link between said second storage device and said packet switching device; and
   a third serial communication link between said host and said packet switching device,
   wherein should said host transmit serial data packets addressed to said first and second storage devices, any such serial data packets are transmitted over said third communication link to said packet switching device, with said packet switching device transmitting any serial data packet received from said host over said first communication link if the serial data packet is addressed to said first storage device and over said second communication link if the serial data packet is addressed to said second storage device,
   with one of said host or said packet switching device transmitting logging data to said reserved area, said logging data provided in serial data packets addressed to said first storage device.

2. The network of claim 1, wherein the other of said host or said packet switching device provides logging data in serial data packets to said reserved area.

3. The network of claim 2, wherein said logging data is performance monitoring data.

4. The network of claim 2, wherein said logging data is diagnostic data.

5. The network of claim 4, wherein said logging data further includes performance monitoring data.

6. The network of claim 2, further comprising:
   a computer executing a management application and capable of reading said reserved area by requesting serial data packets from said first storage device; and
   a fourth serial communication link between said computer and said packet switching device.

7. The network of claim 6, wherein said management application reads logging data of both said host and said packet switching device.

8. The network of claim 2, wherein said second storage device further provides logging data in serial data packets to said reserved area.

9. The network of claim 1, wherein said first storage device e and said second storage device are combined in a single storage unit.

* * * * *